8884X
J. G. Palmer H & A. Beard,
Riding Saddle.
Patented June 12, 1835.
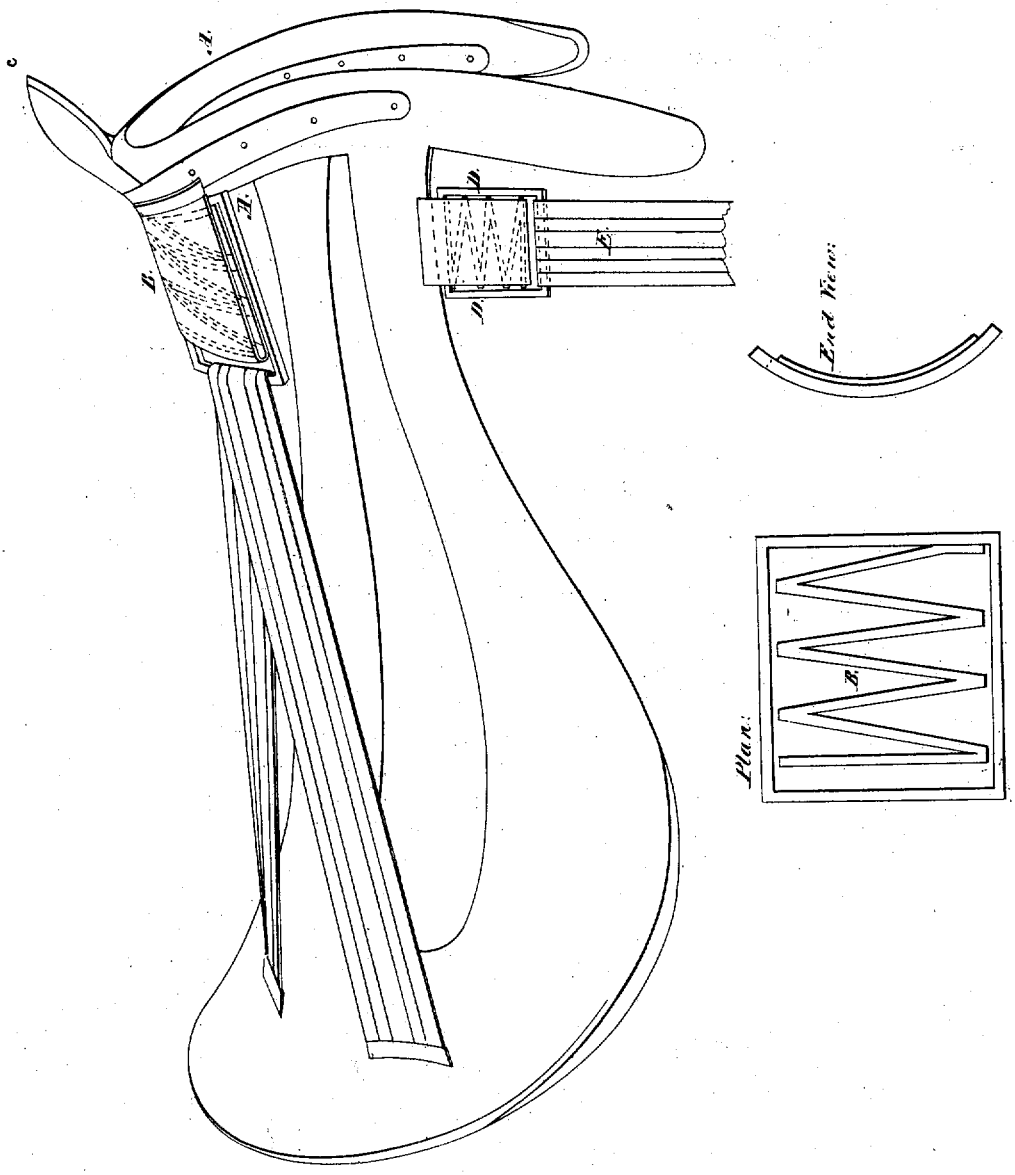
N. PETERS, PHOTO-LITHOGRAPHER, WASHINGTON, D.C.

Jacob G. Palmer, Harvey Beard, and Anthony Beard.
Letters Patent

The Schedule referred to in these Letters Patent and making part of the
same containing a description in the words of the said, Jacob G. Palmer
Harvey Beard and Anthony Beard, themselves of their improvement in
the spring seat riding saddle

---

To All To Whom These Presents Shall Come. Be it known that
we Jacob G Palmer Harvey Beard and Anthony Beard of the Town
of Greenville in the County of Augusta and State of Virginia have in-
vented a new and useful improvement in the spring seat riding sad-
dle and that the following is a full and exact description of the con-
struction and operation of the same as invented or improved by us. Our
improvements are applicable to any of the saddles in ordinary use and
consist in the application of springs of peculiar construction to the seat
and pommel and to the attachments of the girth or girths to the tree,
also in the construction of the head or pommel: we shall therefore con-
fine our description particularly to those parts. First in constructing
the seat spring, we form an oblong square frame of wrought iron or steel
of say 1/4 inch thick and three inches and three quarters long by two inch-
es wide more or less according to the quantity of elasticity required. To the
inner side of this frame & near the end of one of its long sides is to be secured
by rivets or welding one extremity of a zig zag or W shaped spring to be
made of tempered steel say 1/8 inch thick by 1/4 of an inch broad, and lap-
ped from side to side within the frame five or more times taking care to
allow sufficient play for the action of the spring and also space enough be-
tween its loose end and the side of the frame contiguous thereto for the passage
of the connecting straps herein after mentioned and so that the frame and
spring may lie in the same plane, a proper degree of curvature is then given
to them to conform them to the gullet of the saddle or tree. A strong strap
of leather being now passed over the loose end of the spring its ends are doub-
led back over the latter and secured by [illegible] (in the ordinary manner of se-
curing

8884X sewing webbing) to the upper side of the head of the tree, thus suspending
the spring) frame. We prefer also passing an additional piece of strong web-
bing over the leather to be secured with it. so as to form a double covering to the
spring and frame which serves the two fold purpose of protecting the horses
back and of preventing fr the spring from corroding. We next pass a piece
of strong webbing broad as the frame will admit, over the opposite side to
that which bears the spring and drawing them taught in a diverg-
ing direction attach the ends by tacking firmly to the under side of the
cantle, the covering of the seat is then drawn on in the common way.
Second the girth springs are constructed precisely like that just describe,
the only difference being in their size, which is proportionally less and
in their being perfectly flat, they are attached to the sides of the tree by
straps in a similar manner. Third - the pommel, in the head of the
tree which is made in the usual way. We secure an iron horn as fol-
lows. the pointed shank of the horn, which also has shoulders, is passed
in between the top and gullet plate and is then bent down or clinch-
ed over the back edge of the latter, by which means it is secured firmly,
to the tree, The horn itself is a spoon shaped flattened piece of wrought iron,
1/4 of an inch thick at the shank, and diminishing regularly to 1/8 of an
inch at its front edge. its breadth being about two inches at its end
and one at the shank. rising from the shank with a gentle curve forward
to a horizontal line, the precise figure is not deemed material and is
therefore left to the fancy of the maker. This horn is first completely cov-
ered with two pieces of thick leather stitched together all around close
to the plate and then the whole covered with welting or stitching as
may be preferred.† Some of the advantages of our improvements are the
great simplicity and cheapness of the spring and its attachments being
less liable to get out of order. and by conforming neatly to the gullet of
the saddle; its bulk scarcely being perceptible, at the same time
making an easy elastic seat for both the horse and the rider. also its
application and perfect adaptation to the girth of the saddle which
by its means not only performs its office better, but with more comfort to the
horse and is completely protected from injuries arising from violent

[illegible] sudden exertions; Also our horn possesses great advantages over those made of wood, in common use, by being applicable to any tree, much stronger and more durable and capable of being shaped or altered so as to suit any purchaser. Now we do not claim as new in the construction of spring seat saddles, the application of a spring to the head of the tree nor a spring of zig zag or W shape (as applied to this purpose; But what we do claim as new and our invention and for which we ask Letters Patent is the form and manner of constructing the frame and attaching the spring thereto both being curved so as to conform to the gullet of the saddle and being attached to the tree by straps and webbing as herein described, we also distinctly claim the application and use of similar springs to the girth or girths of the saddle and also the iron horn secured and covered as herein described and set forth. (In testimony that the foregoing is a true specification of our said improvements we have hereunto set our hands this twenty third day of May 1835.

Witnesses
Adam Shultz
Elijah Rutledge

Jacob G. Palmer
Harvey Beard
Anthony Beard

Exd
W.T.C.

1027. Words] (Patented June 12 1835.)

(Drawing in Portfolio)